United States Patent [19]

Khmelkov et al.

[11] 4,412,936
[45] Nov. 1, 1983

[54] PIGMENT FOR COLOR-CHANGING HEAT INDICATOR

[76] Inventors: Stanislav F. Khmelkov, prospekt Lenina, 39, kv. 34; Mnaidar R. Ramazanov, ulitsa Lermontova, 7; Mikhail P. Soldatov, ulitsa Gogolya, 71, kv. 2; Vadim V. Beskaravainy, ulitsa Solnechnaya, 3, kv. 2; Viktor L. Aranovich, ulitsa Gogolya, 61, kv. 2; Lev K. Soldaev, ulitsa Kommunalnaya, 2, kv. 2, all of Almalyk, U.S.S.R.

[21] Appl. No.: 261,638

[22] Filed: May 7, 1981

[30] Foreign Application Priority Data

Jun. 20, 1980 [SU] U.S.S.R. .............................. 2932951

[51] Int. Cl.$^3$ ....................... C01K 11/14; C09K 3/00; C01G 3/00; C01G 3/04; C01G 13/00; C01G 13/04
[52] U.S. Cl. ............................. 252/408.1; 106/288 B; 252/962; 423/42; 423/46; 423/101; 423/103; 423/366; 423/385; 423/413; 423/463; 436/2
[58] Field of Search ................. 252/408.1, 962; 436/2; 106/288 B; 423/42, 46, 101, 103, 413, 366, 385, 463; 374/161, 162

[56] References Cited

U.S. PATENT DOCUMENTS 3,219,993  11/1965  Schwertz ........................ 252/408.1

FOREIGN PATENT DOCUMENTS 2611602   9/1977  Fed. Rep. of Germany ... 252/408.1
53-70931  6/1978  Japan ................................. 252/408.1
54-138546 10/1979 Japan ................................. 252/408.1
352922   10/1972  U.S.S.R. ........................... 252/408.1
735620    5/1980  U.S.S.R. ........................... 252/408.1

OTHER PUBLICATIONS

Suchow, L. et al., J. Am. Chem. Soc., vol. 75, pp. 518–522 (1953).
Gallais, M. F., Ann. Chim., pp. 117–193 (1938).
Day, J. H., Chem. Rev., vol. 68, No. 6, pp. 649–657 (1968).

Primary Examiner—Teddy S. Gron
Attorney, Agent, or Firm—Burgess, Ryan and Wayne

[57] ABSTRACT

A pigment for a color-changing heat indicator comprising a product obtained by interaction of an aqueous solution containing ions of copper and mercury with an aqueous solution of a nitrogen-containing organic compound: an amide of carbonic acid, an amide of thiocarbonic acid, a tertiary amine to give a reaction mixture which is reacted with an aqueous solution containing ions of iodine at an atomic ratio of copper:mercury:iodine equal to 2:1.5:3–5 and an amount of the nitrogen-containing organic compound equal to 0.8–8% of the total content of copper and mercury; the pigment has its critical temperature of from 38° to 70° C. and a heat-resistance of from 160° to 180° C.

7 Claims, No Drawings

PIGMENT FOR COLOR-CHANGING HEAT INDICATOR

The present invention relates to pigments for colour changing heat indicators.

FIELD OF THE INVENTION

These pigments for colour-changing heat indicators are widely employed as alarm marking on the surface of various devices to prevent emergency situations owing to a timely detection of temperature variations. For example, such indicators are employed for detection of short-circuits in electrolysis of heavy metals, wherein other conventional methods of their detection are inapplicable. They are also employed to control the state of junction boxes of high-voltage cables. The temperature elevation marked by the pigment through its colour change makes caution against an emergency situation of the system under control.

BACKGROUND OF THE INVENTION

Known in the art are a number of pigments which are used in compositions of colour-changing heat indicators. For example a pigment comprising a double iodide of copper and mercury (copper tetraiodomercurate) has its critical temperature (i.e. temperature of colour change) of 65±5° C. and heat-resistance (ultimate temperature at which the ability of an indicator of reversing its colour is retained) of 90°–100° C. (cf. B. G. Abramovich "Heat Indicators and Changes Thereof", Moscow, Energija Publishing House, 1972; B. G. Abramovich, V. F. Kartavtsev "Colour Heat Indicators", Moscow, Energija Publishing House, 1978.

Known in the art is a pigment for a colour-changing indicator consisting of a double salt of mercury and silver iodides and a double salt of mercury and copper iodides (E. Chiric, Culori Termoscopie, "Metrologia Aplicata", 1957, No. 4). This pigment has critical temperatures within the range of from 45° to 100° C. However, its application is economically inefficient, since for its preparation use is made of expensive silver; furthermore, its preparation procedure necessitates safe techniques for handling a strong poisonous substance.

Also known is a colour-changing indicator containing, as a pigment, iodides of copper and mercury suspended in a rigid heat-resistant transparent synthetic matrix (cf. FRG Pat. No. 1,698,095). This colour-changing indicator has a critical temperature of 68±5° C. and a heat-resistance of from 127° to 135° C.

A pigment consisting of compounds of iodides of copper and mercury and ortho-oxyquinoline is incorporated in a composition of a reversible colour-changing heat-indicating coating (cf. USSR Inventor's Certificate No. 735620) with a critical temperature of 65±5° C. and heat-resistance of 140°–150° C.

These colour-changing heat indicators have a comparatively high critical temperature of colour change, 60°–68° C., thus considerably limiting their field of application, for example for visual detection of short-circuits in electrorefining of heavy non-ferrous metals, in particular copper. The degree of response of such heat-indicators to a short-circuit is low, especially during autumn-winter periods where the temperature of the controlled surface is below critical due to a considerable heat-transfer despite the short-circuit; the degree of response of the heat indicator to short circuits is only 26 to 37% of the total number thereof. Due to a specific character of the process of electrorefining of copper, the events of surpassing the heat-resistant temperature of the indicator should not be underestimated, wherefore the heat indicator becomes "burnt", i.e. loses its colour-reversibility.

SUMMARY OF THE INVENTION

It is an object of the present invention to provide such a pigment for a colour-changing heat indicator which would have lower critical temperatures within a sufficiently wide temperature range and an increased heat resistance.

This and other objects of the present invention are accomplished by a pigment for a colour-changing heat indicator which comprises a product prepared by interaction of an aqueous solution containing ions of copper and mercury, with an aqueous solution of a nitrogen-containing organic compound: carbonic acid amide, thiocarbonic acid amide, tertiary amine with the formation of a reaction mixture which is reacted with an aqueous solution containing ions of iodine at an atomic ratio of copper:mercury:iodine equal to 2:1.5–3–5 respectively and an amount of the nitrogen-containing organic compound equal to 0.8–8% of the total content of copper and mercury; the pigment has its critical temperature of from 38° to 70° C. and heat-resistance of 160° to 180° C.

As carbonic acid amides it is advisable to use urea, as thiocarbonic acid amides-thiourea, as tertiary amines-hexamethylenetetramine.

The above-specified ratio of the components is indispensible and sufficient to ensure the properties required, which are characteristic for pigments for colour-changing heat indicators.

The pigment for colour-changing heat indicators according to the present invention, as it has been mentioned hereinabove, has a critical temperature of from 38° to 70° C. and heat-resistance of from 160° to 180° C. Owing to the extension of the critical temperatures interval such heat indicator responses to lower temperatures as compared with known ones and can be used in any season of the year (applied to an electrolysis of non-ferrous methods). With the use of pigments for colour-changing heat indicators according to the present invention the degree of a timely detection of short-circuits is as high as 93–97%. An inreased heat-resistance temperature makes it possible to lower the rate of consumption of the pigment due to a reduced number of burnt heat-indication marks.

Given hereinbelow are certain thermophysical characteristics of the pigment according to the present invention in comparison with a colour-changing heat indicator comprising copper tetraiodomercurate.

| Characteristic | Known pigment | Pigment of the invention |
|---|---|---|
| Initial colour | bright red | bright red, orange |
| Temperature of colour change, °C. | 60 | 38–70 within this temperature range the pigment can have any discrete value depending on varied proportions of the components. |
| Heat-resistance, °C. | 110–127 | 160–180 |
| Acquired colour after reaching the critical temperature | dark cherry | dark cherry, cherry-black |

| Characteristic | Known pigment | Pigment of the invention |
| --- | --- | --- |
| Duration of heat effect at heat-resistance temperatures, hrs | 0.5 | 4–8 |
| Time of colour recovery, min | 10–15 | 10–15 |
| Number of colour reversals | above 900 times | above 900 times |

The pigments according to the present invention are widely employed in colour-changing heat indicator compositions. Such heat indicators are produced in a conventional manner such as by mixing the pigment with a binder. As a rule such binders comprise organic varnishes.

DETAILED DESCRIPTION OF THE INVENTION

The process for producing the pigment for a colour-changing heat indicator is simple and can be effected in the following manner.

In separate vessels there are prepared the following aqueous solutions:

a solution containing ions of copper, e.g. a solution of copper sulphate, copper chloride or copper nitrate-solution I;

a solution containing mercury ions, for example a solution of mercury nitrate or mercury chloride-solution 2;

a solution containing iodine, for example a solution of potassium iodide-solution 3;

a solution containing an organic nitrogen-containing compound, for example carbonic acid amide, thiocarbonic acid amide of hexamethylenetetramine—solution 4.

Solutions 1 and 2 are mixed and the resulting mixture is added with the calculated volume of solution 4 under vigorous stirring. As a result, a reaction mixture is obtained which is added with solution 3. A precipitate is formed which comprises the desired product; it is isolated by conventional methods such as decantation followed by filtration and drying of the product to a moisture content of 2 to 4%.

The final product is stored in tightly closed vessels.

For a better understanding of the present invention, some specific examples are given hereinbelow by way of illustration.

EXAMPLE 1

Solutions 1 and 2 are prepared; to this end 60 g of copper sulphate are dissolved in 180 ml of water (solution 1) and 60 g of mercury nitrates are dissolved in 180 ml of water (solution 2) which solutions are then combined. To the resulting mixture of the solutions an aqueous solution is added under vigorous stirring which contains 5 g of thiourea. A reaction mixture is thus obtained which is added with an aqueous solution of potassium iodide (120 g of potassium iodide in 360 ml of water—solution 3). The resulting precipitate of the desired product is separated and subjected to drying at a temperature of from 35° to 40° C.

The thus-produced pigment has the following properties:
Critical temperature, °C. 40±5
heat-resistance, °C. 160

EXAMPLE 2

Solutions 1, 2 and 3 are prepared following the procedure described in Example 1 hereinbefore. Solutions 1 and 2 are combined and to the resulting mixture an aqueous solution containing 2.5 g of thiourea is added under vigorous stirring. The desired product is isolated as described in Example 1. The resulting product has the following characteristics:
Critical temperature, °C. 55±5
Heat-resistance, °C. 170

EXAMPLE 3

Solutions 1, 2 and 3 are prepared as described in Example 1. Solutions 1 and 2 are combined. The resulting mixture of the solutions is added with an aqueous solution containing 1.0 g of thiourea under vigorous stirring. Solution 3 is added to the resulting, reaction mixture. The desired product is separated as in Example 1. The resulting pigment has the following characteristics:
Critical temperature, °C. 65±5
Heat-resistance, °C. 180

EXAMPLE 4

Solutions 1, 2 and 3 are prepared as described in Example 1 hereinbefore. Solutions 1 and 2 are combined. The resulting mixture of the solutions is added with an aqueous solution containing 2.0 g of hexamethylenetetramine under vigorous stirring. Solution 3 is added to the resulting reaction mixture. The desired product is isolated as described in Example 1. The resulting products has the following characteristics:
Critical temperature, °C. 55±5
Heat-resistance, °C. 170

EXAMPLE 5

Solutions 1, 2 and 3 are prepared following the procedure described in Example 1. Solutions 1 and 2 are combined. To the resulting mixture of the solutions an aqueous solution containing 0.5 g of hexamethylenetetramine is added under vigorous stirring. To the thus-prepared reaction mixture solution 3 is added. The desired product is isolated as described in Example 1.

The resulting product has the following characteristics:
Critical temperature, °C. 65±5
Heat-resistance, °C. 170

EXAMPLE 6

Solutions 1, 2 and 3 are prepared as described in Example 1. Solutions 1 and 2 are combined. The resulting mixture of the solutions is added, under vigorous stirring, with an aqueous solution containing 3 g of urea. Solution 3 is added to the resulting reaction mixture.

The thus-prepared product has the following properties:
Critical temperature, °C. 65±5
Heat-resistance, °C. 180.

What is claimed is:

1. A method of producing a pigment for a color-changing heat indicator which comprises:
(a) mixing an aqueous solution containing ions of bivalent copper and mercury with an aqueous solution of a nitrogen containing compound selected from the group consisting of an amide of carbonic or thiocarbonic acid, and a tertiary amine in an amount equal to 0.8–8.0% of the total content of copper and mercury, and (b) adding to the resulting mixture, an aqueous solution containing iodine ions to thereby form a pigment wherein the atomic ratio of Cu:Hg:I in said pigment is 2:1.5:3–5.

2. The method according to claim 1, further comprising drying said pigment to a moisture content of between 2 and 4%.

3. The method according to claim 1 wherein said carbonic acid amide is selected from the group consisting of urea and thiourea.

4. The method according to claim 1 wherein said tertiary amine is hexamethylenetetramine.

5. The method according to claim 3, wherein the carbonic acid amide is urea.

6. The method according to claim 3, wherein the carbonic acid amide is thiourea.

7. The product produced by the process of claims 1, 2, 3, 4, 5 or 6.

* * * * *